United States Patent
Battle et al.

(10) Patent No.: US 10,740,140 B2
(45) Date of Patent: Aug. 11, 2020

(54) FLUSH-RECOVERY BANDWIDTH IN A PROCESSOR

(71) Applicant: International Business Machines Corporation, Armonk, NY (US)

(72) Inventors: Steven J. Battle, Austin, TX (US); Khandker Nabil Adeeb, Travis, TX (US); Brian D. Barrick, Pflugerville, TX (US); Joshua W. Bowman, Austin, TX (US); Susan E. Eisen, Round Rock, TX (US); Brandon Goddard, Kirkland, WA (US); Jamory Hawkins, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 16/193,260

(22) Filed: Nov. 16, 2018

(65) Prior Publication Data
US 2020/0159564 A1 May 21, 2020

(51) Int. Cl.
*G06F 9/38* (2018.01)
*G06F 9/46* (2006.01)
(52) U.S. Cl.
CPC ............ *G06F 9/462* (2013.01); *G06F 9/3806* (2013.01); *G06F 9/3836* (2013.01); *G06F 9/3861* (2013.01)
(58) Field of Classification Search
None
See application file for complete search history.

(56) References Cited

U.S. PATENT DOCUMENTS

| 5,581,775 | A | * | 12/1996 | Katz | G06F 9/3863 711/200 |
| 5,805,906 | A | * | 9/1998 | Cheong | G06F 9/30141 710/260 |
| 5,860,014 | A | * | 1/1999 | Cheong | G06F 9/3861 710/260 |
| 5,870,612 | A | * | 2/1999 | Cheong | G06F 9/3836 710/260 |
| 5,887,161 | A | * | 3/1999 | Cheong | G06F 9/3836 712/228 |
| 5,913,048 | A | * | 6/1999 | Cheong | G06F 9/3836 712/215 |

(Continued)

*Primary Examiner* — Steven G Snyder
(74) *Attorney, Agent, or Firm* — Scully, Scott, Murphy & Presser, P.C.

(57) ABSTRACT

A computer system, processor, and method for processing information is disclosed that includes at least one computer processor for processing instructions, the processor having a history buffer having a plurality of entries for storing information associated with a processor instruction evicted from a logical register, the history buffer having at least one recovery port; a logical register mapper for recovering information from the history buffer, the mapper having restore ports to recover information from the history buffer; and a restore multiplexor configured to receive as inputs information from one or more of the history buffer recovery ports, and configured to output information to one or more of the logical register mapper restore ports. The processor, system and/or method configured to improve flush recovery bandwidth.

20 Claims, 7 Drawing Sheets

(56) References Cited

U.S. PATENT DOCUMENTS

| | | | | |
|---|---|---|---|---|
| 5,935,241 | A * | 8/1999 | Shiell | G06F 9/3804 |
| | | | | 712/238 |
| 6,070,235 | A * | 5/2000 | Cheong | G06F 9/3824 |
| | | | | 712/218 |
| 6,633,970 | B1 * | 10/2003 | Clift | G06F 9/384 |
| | | | | 712/217 |
| 6,721,874 | B1 | 4/2004 | Le et al. | |
| 7,996,663 | B2 | 8/2011 | Stillwell, Jr. et al. | |
| 8,935,694 | B2 | 1/2015 | Muff et al. | |
| 9,740,620 | B2 * | 8/2017 | Ayub | G06F 12/0875 |
| 9,971,604 | B2 * | 5/2018 | Chadha | G06F 9/3863 |
| 9,996,353 | B2 * | 6/2018 | Genden | G06F 9/3013 |
| 10,067,766 | B2 * | 9/2018 | Genden | G06F 9/3013 |
| 10,108,423 | B2 * | 10/2018 | Genden | G06F 9/30127 |
| 10,175,985 | B2 * | 1/2019 | Chadha | G06F 9/30101 |
| 10,248,426 | B2 * | 4/2019 | Barrick | G06F 9/3857 |
| 10,592,422 | B2 * | 3/2020 | Barrick | G06F 3/065 |
| 2001/0044882 | A1 * | 11/2001 | Pille | G06F 9/30141 |
| | | | | 711/149 |
| 2007/0204137 | A1 * | 8/2007 | Tran | G06F 9/3861 |
| | | | | 712/214 |
| 2015/0324204 | A1 * | 11/2015 | Eisen | G06F 9/38 |
| | | | | 712/215 |
| 2016/0253177 | A1 * | 9/2016 | Genden | G06F 9/3013 |
| | | | | 712/240 |
| 2016/0253180 | A1 * | 9/2016 | Genden | G06F 9/3859 |
| | | | | 712/240 |
| 2016/0253181 | A1 * | 9/2016 | Chadha | G06F 9/3863 |
| | | | | 712/216 |
| 2016/0283236 | A1 * | 9/2016 | Genden | G06F 9/30127 |
| 2017/0109166 | A1 * | 4/2017 | Eisen | G06F 9/30072 |
| 2017/0277541 | A1 * | 9/2017 | Chadha | G06F 9/30101 |
| 2017/0344380 | A1 * | 11/2017 | Barrick | G06F 9/3863 |
| 2019/0188133 | A1 * | 6/2019 | Terry | G06F 11/00 |
| 2019/0188140 | A1 * | 6/2019 | Barrick | G06F 9/384 |
| 2020/0081713 | A1 * | 3/2020 | Islam | G06F 9/30141 |

* cited by examiner

FLUSH-RECOVERY BANDWIDTH IN A PROCESSOR

BACKGROUND OF INVENTION

The present invention generally relates to information handling and data processing systems, processors, and more specifically to recovering and restoring Logical Registers after a flush operation.

Modern information and data handling systems often execute instructions out of order to achieve greater processing efficiency. To handle executing out-of-order instructions, processors typically are "pipelined" and have multiple elements that operate in parallel to process multiple instructions in a single processing cycle. Pipelining involves processing instructions in stages, so that the pipelined stages may process a number of instructions concurrently. To improve throughput, processors may include multiple pipelines or execution slices within each processor core. Multiple execution slices may be used as part of simultaneous multi-threading within a processor core.

Typically, a processor pipeline may refer to a set of data processing circuitry or hardware units arranged in series within a processor. The processor pipeline usually includes a number of stages, and may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue (ISQ) typically is issued to an execution unit in an "execution" stage. The "execution" stage processes the operation as specified by the instruction. Executing an operation specified by an instruction typically includes accepting data, e.g., one or more operands, and producing one or more results. There are usually registers and queues associated with the execution units and/or the issue queue (ISQ) to hold data, information and/or instructions for the execution units.

An out of order processor typically executes instructions as soon as its operands are available (and valid), independent of the original instruction sequence. Consequently, as these processors execute out-of-order instructions, they generate numerous temporary register results. The temporary values are stored together with completed values in register files. The temporary values become complete or permanent values when the corresponding instructions are complete.

Executing instructions out-of-order creates additional complexity in handling and processing instructions. Depending upon how the instructions are handled in out-of-order processors, processor latency and inefficiency may result. In out-of-order processors, an instruction can change a register value before all of the prior instructions complete. If any of the prior instructions cause an exception or interruption, then all of the sequential instructions prior to the time of the exception, e.g., an interruptible instruction, will need to be flushed. As a result, the registers allocated to the instructions being flushed will also need to be flushed.

One of the complexities in handling and processing out-of-order instructions is restoring the processor state in the event of an interruptible instruction, e.g., a mispredicted branch instruction. In this regard, logical registers will need to be restored to the state they were in before the exception, e.g., interruptible instruction. For this reason, out-of-order processors typically have a history buffer, e.g., Save & Restore Buffer (SRB), that stores the content of logical registers in order to recover the content of the logical registers in the event of an exception. If an exception occurs, for example, a branch mispredict, then typically the content of the logical registers is flushed, and data is recovered from the history buffer, e.g., SRB, to place the logical registers in the condition that existed before the exception, e.g. the interruptible instruction. Flushing and recovering the contents of the logical registers can introduce latency and delay to a processor.

SUMMARY

The summary of the disclosure is given to aid understanding of a computer system, computer architectural structure, processor, and method of restoring logical registers in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

Certain aspects of the present disclosure provide a computer system for processing information, the computer system including at least one computer processor for processing instructions, the processor having a history buffer having a plurality of entries for storing information associated with a processor instruction evicted from a logical register, the history buffer having at least one recovery port; a logical register mapper for recovering information from the history buffer, the mapper having restore ports to recover information from the history buffer; and a restore multiplexor configured to receive as inputs information from one or more of the history buffer recovery ports, and configured to output information to one or more of the logical register mapper restore ports. In an embodiment, the restore multiplexor includes a plurality of multiplexors, with at least one restore multiplexor per mapper type. In an embodiment, the processor further comprises one or more physical register files partitioned by the register type, each partition having a plurality of entries to store data; and a logical register mapper for each register type, and a plurality of multiplexors where at least one multiplexor is dedicated to each register type. In an aspect, one or more of the history buffer recovery ports are directly connected to the mapper restore ports, and in a further aspect one or more of the history buffer recovery ports bypass the restore multiplexors and connect to the mapper restore ports.

In an embodiment a computer system for processing information is disclosed, the computer system having at least one computer processor for processing instructions, the processor comprising per superslice; a history buffer having a plurality of entries for storing information associated with a processor instruction evicted from a logical register, the history buffer having "N" recovery ports and a Lookup to find "N" history buffer entries in response to a recovery process; a logical register mapper for recovering information from the history buffer, the mapper having "N" restore ports to recover information from the history buffer; and a restore multiplexor configured to receive as inputs information from one or more of the history buffer recovery ports, and configured to output information to one or more of the logical register mapper restore ports, wherein the processor is configured and adapted so that N/2 history buffer recovery reports are connected to the restore multiplexor and N/2 history buffer recovery ports are connected to the restore ports, where N is an integer.

A method of recovering information in a processor is also disclosed that includes, in an embodiment, driving information in a first slice to one or more history buffer multiplexors; driving information in a second slice to the one or more history buffer multiplexors and to one or more history buffer recovery ports; releasing information to one or more history buffer recovery ports; releasing information from one or more history buffer recovery ports to one or more logical register mappers; releasing information from one or more history buffer recovery ports to one or more restore multiplexors; and releasing output of one or more restore multiplexors to one or more logical register mappers. In an aspect, information driven in the first slice to the one or more history buffer multiplexors is selected to be released to a first set of one or more history buffer recovery ports and information driven in the second slice is driven to a second set of one or more history buffer recovery ports.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features, and embodiments of the information handling system, computer system, computer architectural structure, processor, history buffers, mappers, logical registers, and their method of operation will be better understood when read in conjunction with the figures provided. Embodiments are provided in the figures for the purpose of illustrating aspects, features, and/or various embodiments of the computer system, computer architectural structure, processor, history buffers, e.g., Save & Restore Buffers (SRB), logical registers, mappers and their method of operation, but the claims should not be limited to the precise arrangement, structures, subassemblies, circuitry, modules, units, features, aspects, methods, processes, embodiments, or devices shown, and the arrangements, structures, subassemblies, circuitry, modules, units features, aspects, methods, processes, embodiments, and devices shown may be used singularly or in combination with other arrangements, structures, subassemblies, circuitry, modules, units, features, aspects, methods, processes, embodiments, and devices.

DETAILED DESCRIPTION

The following description is made for illustrating the general principles of the invention and is not meant to limit the inventive concepts claimed herein. In the following detailed description, numerous details are set forth in order to provide an understanding of the information handling system, computer system, computer architectural structure, processor, history buffers, e.g., SRBs, logical registers, mappers, and their method of operation, however, it will be understood by those skilled in the art that different and numerous embodiments of the computer system, computer architectural structure, processor, history buffer, logical registers, mappers and their method of operation may be practiced without those specific details, and the claims and invention should not be limited to the arrangements, structures, subassemblies, circuitry, modules, units, features, aspects, processes, methods, embodiments, devices, or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of information processing systems, including processors and microprocessor systems and architecture, which are apparent to those skilled in the art. It is assumed that those skilled in the art are familiar with the general architecture of processors, and in particular with processors which operate in an out-of-order execution fashion, including multi-slice processors and their use of history buffers to restore the contents of logical registers. It may be noted that a numbered element is numbered according to the figure in which the element is introduced, and is typically referred to by that number in succeeding figures.

Figure 1:
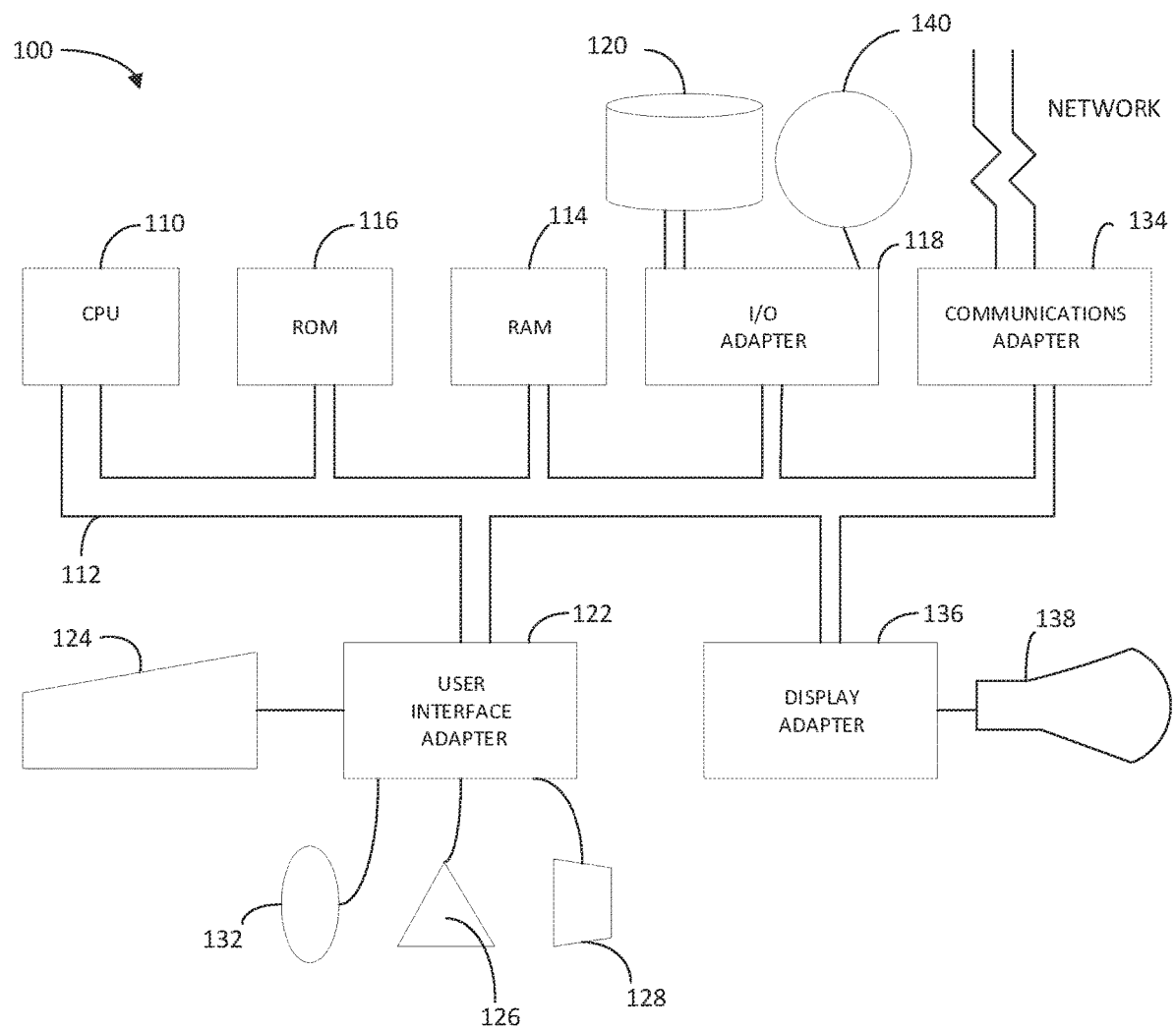
FIG. 1 illustrates an example of a data processing or information handling system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. Processor 110 may have a bus interface unit coupled to the bus 112 for controlling transfers of data and instructions between memory, such as random access memory 114, and caches, e.g. instruction cache (I-Cache) and data cache (D-Cache). Data cache and instruction cache may each have various levels of cache, such as, for example, L1 cache, L2 cache, and/or L3 cache.

I/O adapter 118 may be a small computer system interface ("SCSI") adapter that communicates with a disk storage device 120. Communications adapter 134 interconnects bus 112 with an outside network enabling the data processing system to communicate with other such systems. Input/

Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various logic units, functional units, registers, queues, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
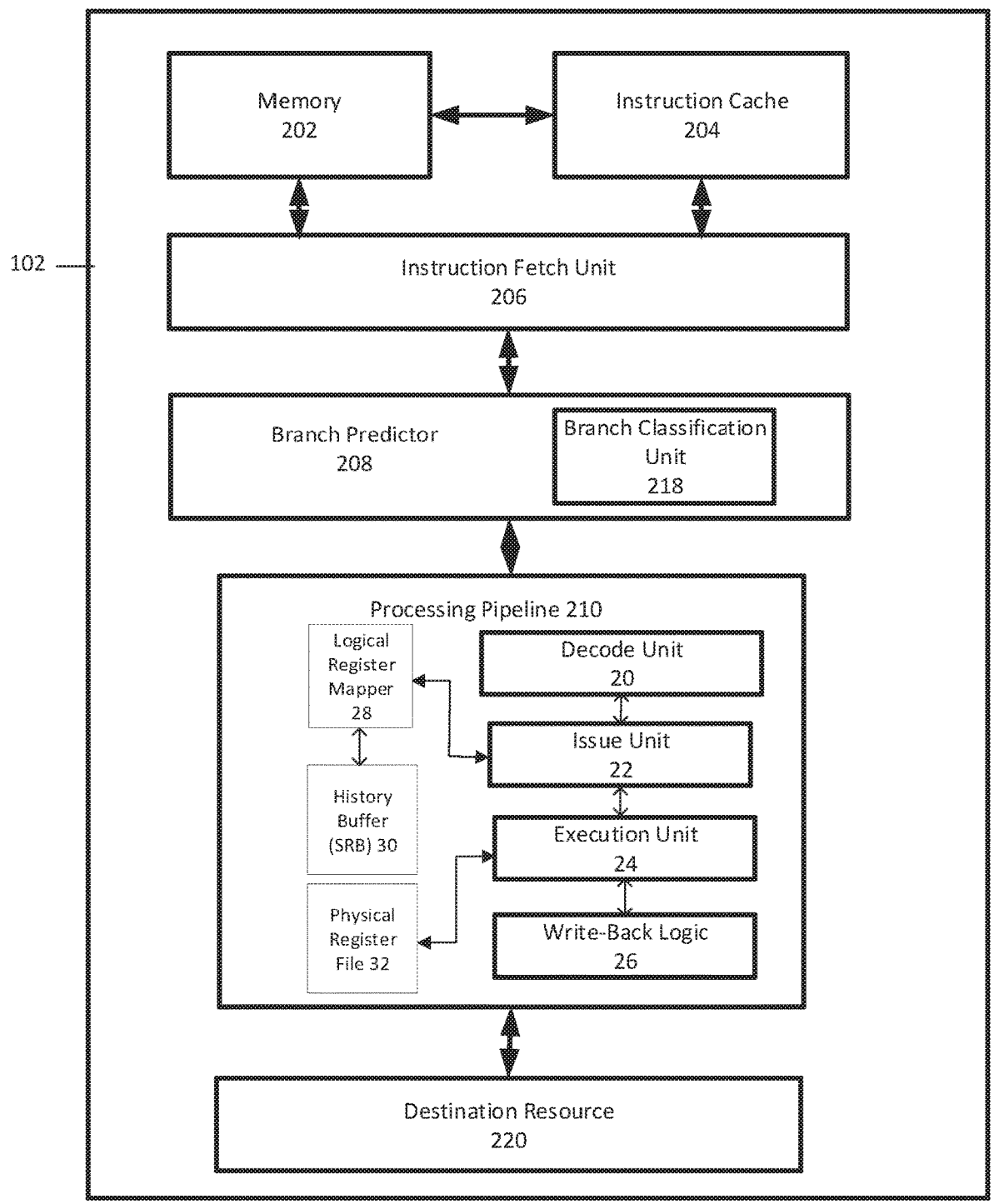
FIG. 2 illustrates a block diagram of a processor in which certain aspects of the present disclosure may be practiced.

FIG. 2 depicts a block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a processor core or otherwise distributed within a computer system. Instructions and data can be stored in memory 202, and the instruction cache 204 may access instructions in memory 202 and store the instructions to be fetched in instruction cache 204. The memory 202 may include any type of volatile or nonvolatile memory, such as cache memory. The memory 202 and instruction cache 204 can include multiple cache levels. A data cache (not depicted) may also be included in the processor 102.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, an issue unit 22, an execution unit 24, write-back logic 26, logical register mapper 28, history buffer, e.g., Save & Restore Buffer (SRB) 30 and physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The decode unit 20 may include a dispatch unit that dispatches the instructions to the issue unit 22. The dispatch unit may exist separately from the decode unit 20. The issue unit 22 analyzes the instructions or other data and transmits the decoded instructions, portions of instructions, or other data to one or more execution units 24 in the pipeline 210 based on the analysis.

Each instruction dispatched to the issue unit 22 typically has an identifier, e.g., identification tag (itag), to identify the instruction. The instructions are allocated (assigned) and stamped with instruction identifiers (itags) in ascending program order on a per thread basis. The processor typically include an instruction counter that increments for each instruction in a thread that is dispatched to the issue unit 22. The issue unit 22 typically holds an instruction until data associated with the instruction has been retrieved and ready for use. One or more physical register files 32 may serve to store data to be used in an operation specified in an instruction dispatched to execution unit 22, and the result of the operation performed by the execution units 24 may be written to the designated target register entry in the physical register 32 using write back logic 26.

When data is not ready, e.g., not within the appropriate data cache or register, delay can result as the issue unit 22 will not issue the instruction to the execution unit 24. For at least this reason, the issue unit 22 typically issues instructions to the execution units 24 out of order so instructions where the required data is available can be issued to the execution unit 24 and executed. The execution unit 24 performs and executes operations specified by the instructions issued to the execution unit 24. The execution unit 24 may include a plurality of execution units, such as fixed-point execution units, floating-point execution units, load/store execution units, vector scalar execution units, etc.

The execution unit 24 executes instructions out of order and when the execution unit 24 finishes an instruction, the execution unit 24 will send the finished instruction, e.g., itag, to an instruction counter table (ICT). The ICT (not shown) contains a queue of the instructions dispatched and tracks the progress of the instructions as they are processed. In an embodiment, the ICT has a completion tail pointer that keeps track of the progress of executing instructions in the thread, e.g., points to the next to complete instruction. The instruction entry in the ICT will not identify the instruction as complete until all older instructions in the thread are completed.

The write-back logic 26 writes results of instruction execution back to a destination resource 220. The destination resource 220 may be any type of resource, including physical register files, cache memory, other memory, I/O circuitry to communicate with other devices, other processing circuits, or any other type of destination for executed instructions or data.

There are circumstances when the instructions and corresponding entries in the logical register mapper 28 and history buffer 30 in the pipeline will need to be flushed. For example, where an interruptible instruction, e.g., branch mispredict, occurs, the information in the logical registers, will need to be flushed and restored. The processor may include a history buffer, e.g., Save & Restore Buffer (SRB) 30, to save a processor state before, for example, an interruptible instruction, so that if an interrupt occurs, control logic may recover the processor state to the interrupt point by restoring the content of registers, memory cache, and main memory. A history buffer, e.g., Save & Restore Buffer (SRB) 30, contains both speculative and architectured register states and backs up the register file data when a new instruction is dispatched. In this regard, the history buffer stores information associated with a logical register entry when a new instruction evicts the value stored in that logical register entry in case the new instruction is flushed and the old data needs to be recovered. The history buffer keeps the stored information until the new instruction completes. History buffer (SRB) 30 interfaces with logical register mappers 28 in order to restore the contents of the logical register to the state that existed before the interruptible instruction, e.g., the branch instruction was mispredicted.

In operation, when a new instruction with an instruction tag (itag) produces a value to be stored in a logical register "x" after it is executed, the prior value in logical register "x" is evicted from the logical register and the data and information associated with the instruction are stored in the history buffer (SRB) 30. That is, history buffer (SRB) 30 contains logical register entries evicted from the mapper by younger instructions. The information stored in the history buffer may include, in an embodiment, itag, logical register entry number (the bitfield that identifies the logical register entry (LReg)), and register file tag (RFTag) information. The itag of the instruction that evicted the history buffer (SRB) entry (i.e., the evictor itag) from the logical register, and/or other metadata, may also be stored and tracked in the history buffer 30. The information is kept in the history buffer (SRB) 30 in a history buffer (SRB) entry until the new instruction (evictor instruction) is completed. At which point there is no reason to keep the entry in the history buffer, e.g., SRB 30, and the entry is removed from the history buffer, as there is no flush recovery that could cause the history buffer (SRB) entry to be recovered.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

Figure 3:
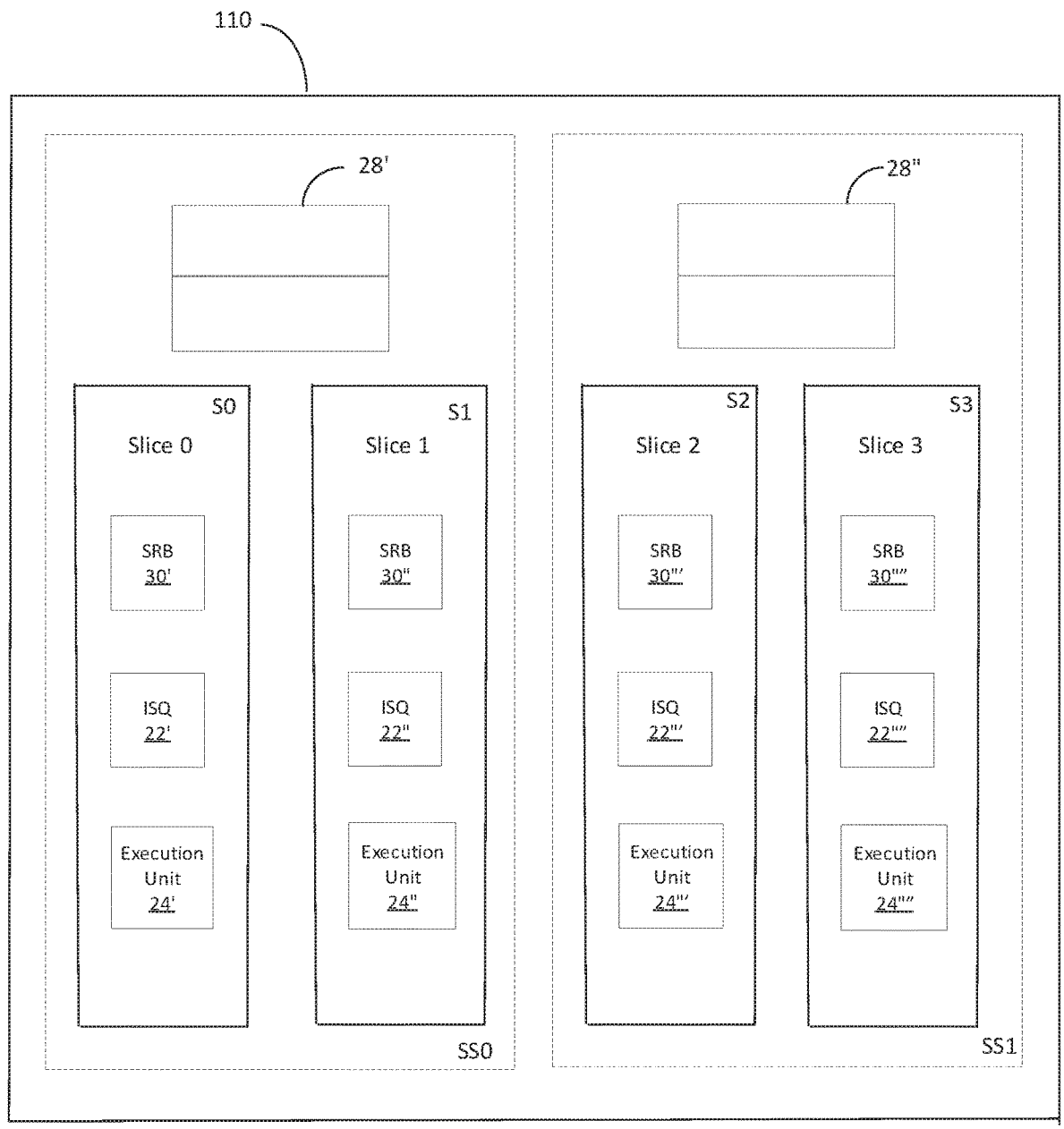
FIG. 3 illustrates a block diagram of a multi-slice processor in accordance with an aspect of the disclosure in which certain aspects of the present disclosure may be practiced.

In certain aspects, a CPU 110 may have multiple execution/processing slices with each slice having one or more of the units shown in FIG. 2. For example, in FIG. 3, processor 110 has four processing slices S0:S3, where each processing slice may have its own processing pipeline with history buffer (SRB) 30, issue unit or issue queue (ISQ) 22, and functional/execution units 24. Two slices may form a super slice, e.g., slice 0 (S0) and slice 1 (S1) form superslice 0 (SS0), and slice 2 (S2) and slice 3 (S3) forms superslice 1 (SS1). A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. In an example, each processing slice may be an independent processor (e.g., processor 110) and may execute instructions independently of other processing slices in the multi-slice processor, so that multiple threads may be simultaneously executed by the multi-slice processor. Simultaneous processing in multiple slices may considerably increase processing speed of the multi-slice processor. Multi-slice processor 110 in FIG. 3 can operate and handle one or more threads of instructions simultaneously. In single-thread (ST) mode a single thread is processed, and in SMT mode, two threads (SMT2) or four threads (SMT4) are simultaneously processed.

The System Management Controller (SMC) partitions the slices S0:S3 according to the mode of operation, i.e., single thread (ST) mode, simultaneous two-thread mode (SMT2), or simultaneous four-thread mode (SMT4). In single thread (ST) mode, the thread T0 has access to all slices. Both superslice SS0 and SS1 mappers 28', 28" handle single thread T0. In SMT2 mode, threads T0 and T2 have access to all slices and both superslice (SS0 and SS1) mappers 28', 28" handle both threads T0 and T2. The logical register mappers 28', 28" keep in sync across the superslices and see all dispatches and recoveries from both superslices. In SMT4 mode, threads T0 and T2 are on superslice 0 (SS0), and superslice 0 (SS0) mappers 28' handle both threads T0 and T2, while threads T1 and T3 are on superslice 1 (SS1) and superslice 1 (SS1) mappers 28" handle threads T1 and T3. The mappers 28', 28" are tied to superslice recovery and dispatch does not keep sync across superslices.

Flush recovery to logical registers is performed through logical register mappers typically by slice from history buffers, e.g., SRBs 30. Each history buffer (SRB) slice has an interface to the logical register mapper to recover the itag and register file tag (RFTag) and other meta data for each evicted logical register entry (LReg). The logical register mappers are typically partitioned into groups to cover the various types of registers, e.g., general purpose registers (GPR), floating point registers (FPR), vector/scalar registers (VSR), etc. For example, the mappers could be partitioned into three (3) groups, each group covering one of a GPR, FPR/lower VSR, and upper VSR. For a logical register having ninety-six (96) entries and partitioned into three groups, each group of the logical register can have thirty-two (32) entries. The mappers could partition the logical registers into different groups and with more or less entries, and with varying number of entries per group of logical register entries (LRegs).

Flush recovery is a factor in processor performance. In processors operating in SMT4 mode, since SS0 mappers handle threads T0 and T2, and since SS1 mappers handle odd threads T1 and T3, a flush of any thread, e.g., T0, typically uses only recovery ports from one of the superslices, e.g., SS0 for thread T0 and SS1 for thread T1. As such recovery bandwidth may be cut in half in SMT4 mode. In an example, during flush recovery of even thread (T0) in a processor operating in SMT4 mode, since thread T0 is on SS0, four (4) history buffer (SRB) entries mapped to the VSR (register) will be read and driven to the VSR mapper, four (4) history buffer (SRB) entries mapped to the FPR (register) will be read and driven to the FPR mapper, and four (4) history buffer (SRB) entries mapped to the GPR (register) will be read and driven to the GPR mapper per cycle since only the recovery ports in superslice SS0 in the history buffer can be utilized.

Disclosed is a technique, method, system, and/or processor for restoring logical registers to the state they were in before an exception, e.g., interruptible instruction. This disclosure speeds up the recovery of logical registers compared to traditional designs by utilizing one or more disclosed techniques, methods, configurations, systems, architectures, logic programming, and embodiments to decrease latency and increase the efficiency of a processor. In an embodiment, in a multi-threading mode (SMT4), recovery bandwidth is increased in order to decrease the amount of cycles, and hence time, required to restore and recover the contents of logical registers. In an embodiment, a system and method is presented to increase bandwidth to eliminate the SMT4 recovery bandwidth penalty. The system, configuration, method and control logic in an aspect includes multiplexing between each pair of superslices in a processor.

Figure 4:
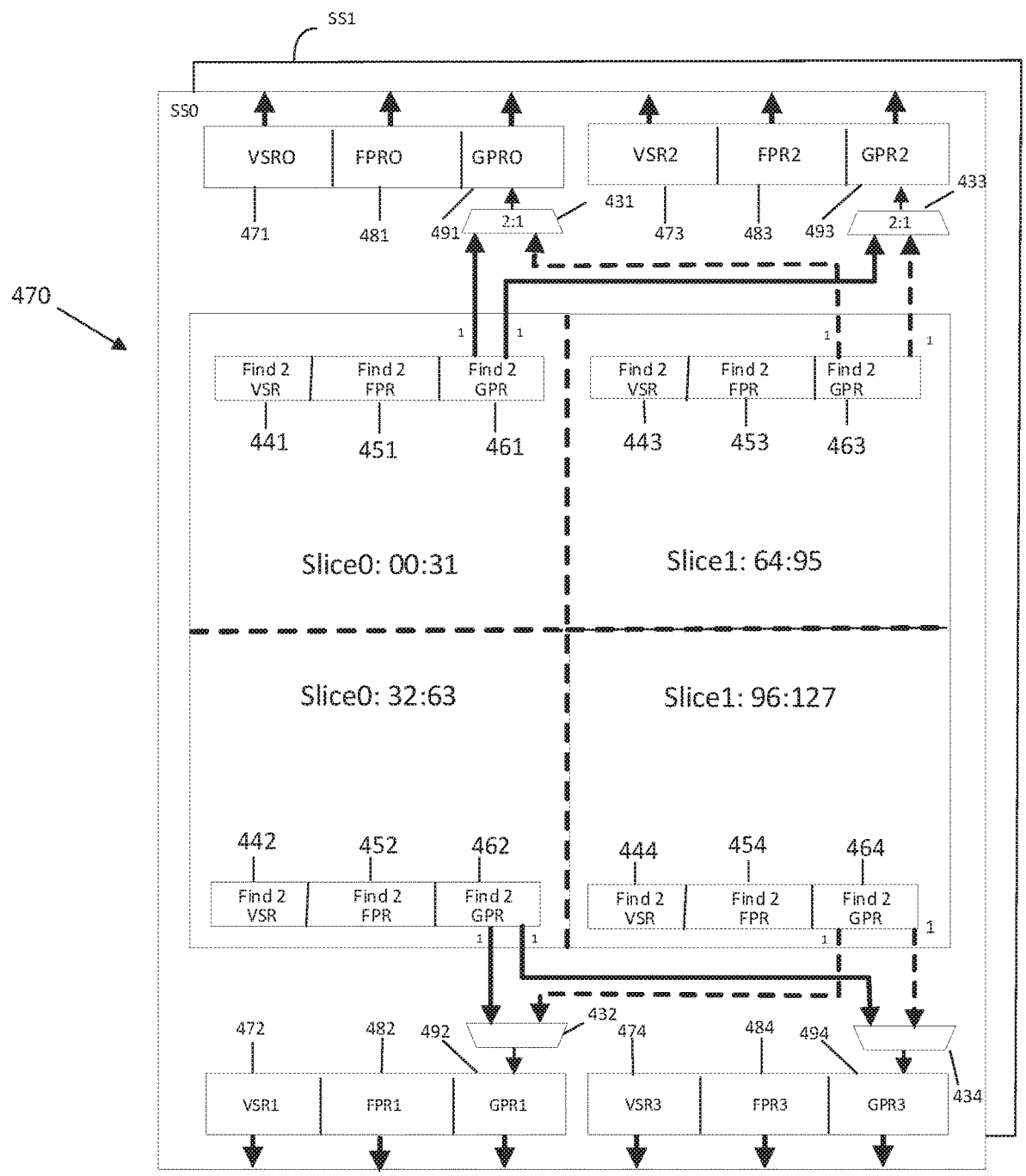
FIG. 4 illustrates a block diagram of a history buffer.

FIG. 4 illustrates a block diagram of superslice 0 (SS0) in an exemplary history buffer 470, e.g., SRB, as may be configured for single thread (ST), SMT2, or SMT4 mode. Superslice 1 (SS1) in an embodiment is configured the same as superslice 0 (SS0) in FIG. 4. In the example of FIG. 4, history buffer (SRB) 470 has 256 entries across four slices where history buffer (SRB) entries 0:63 are in slice 0, history buffer (SRB) entries 64:127 are in slice 1, history buffer (SRB) entries 128:191 are in slice 2; and history buffer (SRB) entries 192:255 are in slice 3. History buffer (SRB) entries, in an embodiment, store itag information, LReg data identifying the logical register, and register file tag (RFTag), and may also contain other metadata for each entry evicted from the logical register.

In the example of FIG. 4, portions of superslice 0 (SS0) are shown which includes slice 0 and slice 1. Super slice 1 (SS1) in an embodiment is the same as superslice 0 (SS0). Each slice S0 and S1 of superslice SS0 has six (6) recovery ports in history buffer (SRB) 370 for 64 SRB entries including two (2) recovery ports mapped to the VSR, two (2) recovery ports mapped to the FPR, and two (2) recovery ports mapped to the GPR. In FIG. 4, superslice 0 (SS0) of history buffer (SRB) 470 has four (4) recovery/read ports 471-474 mapped to the VSR, four (4) recovery/read ports 481-484 mapped to the FPR, and four (4) recovery/read ports 491-494 mapped to the GPR. Superslice 1 (SS1) of SRB 470 would also have four (4) recovery/read ports mapped to the VSR, four (4) recovery/read ports mapped to the FPR, and four (4) recovery ports mapped to the GPR, for a total of twenty-four (24) recovery/read ports in history buffer 470. It is contemplated that history buffer (SRB) 470 may have more or less entries, more or less slices, and more or less read/recovery ports.

In ST mode, thread T0 can be in any slice S0, S1, S2, or S3, and in SMT2 mode, threads (T0) and (T2) can also be in any slice S0, S1, S2, or S3. As shown in FIG. 4, during a recovery operation, history buffer (SRB) slice 0 (S0) will look up four (4) GPR history buffer entries and drive them to multiplexors 431, 432, 433, and 434 located before recovery ports 491, 492, 493 and 494 in history buffer 470. Similarly, as shown in FIG. 4, history buffer (SRB) slice 1 (S1) will look up four (4) GPR history buffer entries and drive them to multiplexers 431, 432, 433, and 434 located before ports 491, 492, 493 and 494 in history buffer 470. For super slice 0 (SS0), eight (8) GPR history buffer entries are driven to the multiplexors (431-434), and four (4) GPR history buffer entries are released to the GPR mapper per cycle in ST and SMT2 mode. Similarly, for super slice 0 (SS0), four (4) history buffer entries mapped to VSR and four (4) history buffer entries mapped to FPR are released to the respective VSR and FPR mappers per cycle in ST and SMT2 modes using multiplexors (not shown) that are arranged like multiplexors 431, 432, 433, and 434. That is eight (8) VSR history buffer entries are looked up and driven to multiplexors, and four (4) VSR history buffer entries are released to the VSR mapper in superslice 0 (SS0) per cycle in ST and SMT2 modes, while eight (8) FPR history buffer entries are looked up and driven to multiplexors, and four (4) FPR history buffer entries are released to the FPR mapper in superslice 0 (SS0) per cycle in ST and SMT2 modes.

Likewise, for superslice 1 (SS1) (not shown in FIG. 4, but which would be configured in and embodiment that same as superslice 0 (SS0)), four (4) history buffer entries mapped to GPR, four (4) history buffer entries mapped to VSR, and four (4) history buffer entries mapped to FPR are released to the respective GPR, VSR and FPR mappers per cycle in ST and SMT2 modes. Flush recovery is performed on a per thread basis. A recovery operation of even thread T0 in ST mode or a recovery of either thread T0 or T2 in SMT2 mode will use recovery ports from both superslices SS0 and SS1. In the example of FIG. 4, eight (8) GPR history buffer entries, eight (8) VSR history buffer entries, and eight (8) FPR history buffer entries can be recovered from the history buffer in ST or SMT2 mode in every cycle. After a flush recovery in ST or SMT2 mode, the mappers need to be in sync regardless of which slice the recovery comes from. That is, if there is a flush of even thread T0, entries recovering from history buffer (SRB) 470 on SS0 need to be seen by the mappers in SS0 and SS1, and entries recovering from history buffer (SRB) 470 on SS1 need to be seen by the mappers in SS0 and SS1.

Figure 5:
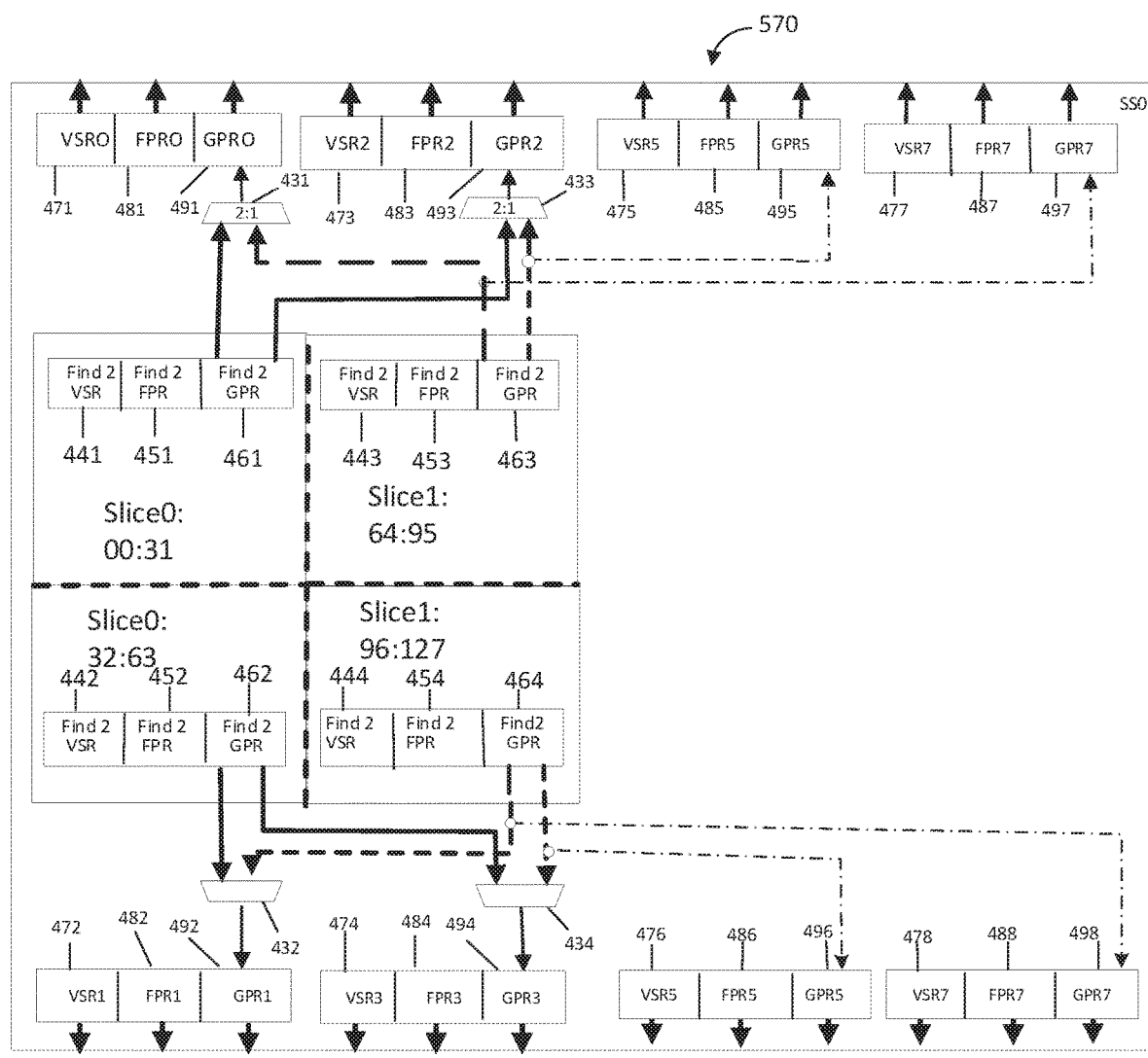
FIG. 5 illustrates a block diagram of a history buffer.

FIG. 5 illustrates a block diagram of an exemplary history buffer 570, e.g., SRB, as configured for ST mode, SMT2 mode, or SMT4 mode, according to an example in which aspects of the present disclosure may be practiced. In the example of FIG. 5, history buffer (SRB) 570 has 256 entries across four slices (S0:S3) as did history buffer 470 in FIG. 4, where history buffer (SRB) entries 0:63 are in slice 0, history buffer (SRB) entries 64:127 are in slice 1, history buffer (SRB) entries 128:191 are in slice 2; and history buffer (SRB) entries 192:255 are in slice 3. Slices 0 and 1 are on superslice 0 (SS0) and slices 2 and 3 are on superslice 1 (SS1).

In the example of FIG. 5, portions of superslice 0 (SS0) are shown which includes slice 0 and slice 1. Superslice 1 (SS1) in an embodiment is configured the same as superslice 0 (SS0). In FIG. 5, superslice 0 (SS0) of history buffer (SRB) 570 has eight (8) recovery/read ports 471-478 mapped to VSR; eight (8) recovery/read ports 481-488 mapped to FPR; and eight (8) recovery/read ports 491-498 mapped to GPR. Superslice 1 (SS1) of SRB 570, in an embodiment also has eight (8) recovery/read ports mapped to VSR, eight (8) recovery/read ports mapped to FPR, and eight (8) recovery/read ports mapped to GPR, for a total of forty-eight (48) recovery/read ports in history buffer 570. Compared to FIG. 4, the configuration of history buffer (SRB) 570 in FIG. 5 has twice as many recovery ports. It is contemplated that history buffer (SRB) 570 may have more or less entries, more or less slices, and more or less read/recovery ports.

In SMT4 mode, even threads T0 and T2 are handled in and assigned to superslice 0 (SS0), e.g., slices 0:1, and odd threads T1 and T3 are handled in and assigned to superslice 1 (SS1), e.g., slices 2:3. As shown in FIG. 5, during a recovery operation, history buffer slice 0 (S0) will use GPR look up 461, 462 to look up four (4) GPR history buffer entries per cycle and drive them to multiplexors 431, 432, 433, and 434 located in history buffer 570 before recovery ports 491, 492, 393 and 494. Similarly, as shown in FIG. 5, history buffer slice 1 (S1) will use GPR lookup 463, 464 to look up four (4) GPR history buffer entries per cycle and drive them to multiplexers 431, 432, 433, and 434 located before recovery ports 491, 492, 493, and 494. In addition, history buffer slice 1 (S1) will also drive the four (4) GPR history buffer entries that are looked up per cycle directly to recovery/read ports 495, 496, 497, and 498 mapped to GPR. That is, recovery ports 495, 496, 497 and 498 are directly connected to the GPR history buffer lookup 463, 464 in slice 1.

The same arrangement can be configured for VSR history buffer entries, where slice 0 in history buffer (SRB) 570 will use VSR look up 441, 442 to look up four (4) VSR history buffer entries per cycle and drive them to multiplexors (not shown but configured like multiplexors 431-434) located before recovery/read ports 471-474 in history buffer 570, and slice 1 will use VSR look up 443, 444 to look up four (4) VSR history buffer entries per cycle and drive them to multiplexors (not shown but configured like multiplexors 431-434) located in the history buffer before recovery ports 471-474. In addition, slice 1 will also drive the four (4) VSR history buffer entries looked up per cycle directly to recovery/read ports 475, 476, 477, and 478, as those ports are directly connected to the VSR lookup 443, 444 in slice 1 in the same manner as GPR ports 495, 496, 497, and 498 are directly connected to the GPR look up. The same arrangement and configuration of multiplexors and connections to recovery ports 481, 482, 483, 484, 485, 486, 487 and 488 is used for FPR history buffer entries as illustrated for GPR history buffer entries.

In ST mode or SMT2 mode, the four (4) VSR ports 471-474; the four FPR ports 481-484; and the four (4) GPR ports 491-494 mux between slices 0 and 1 so that four (4) VSR entries, four FPR entries, and four GPR entries are driven to the respective mappers per cycle per superslice, so a total of eight (8) VSR entries (4 VSR entries per superslice), eight (8) FPR entries (4 FPR entries per superslice), and eight (8) GPR entries (4 GPR entries per superslice) are driven to the logical register mappers from history buffer (SRB) 570 per cycle. Since in ST mode and SMT2 mode, the logical register mappers see all dispatches and recoveries from both superslices, eight (8) VSR logical register entries, eight (8) FPR logical register entries, and eight (8) GPR logical register entries are recovered to the mapper each cycle using four (4) restore ports per superslice for each of the respective VSR, FPR, and GPR mappers.

Since flush recovery operations are threaded based, in SMT4 mode, a flush of a thread (T0:T4) will be only on the superslice which handles that thread, e.g., only superslice 0 (SS0) for even thread (T0 or T2) and only superslice 1 (SS1) for an odd thread (T1 or T3). There is no cross superslice communication in SMT4 mode, so the mappers for superslice 0 (SS0) do not communicate with the mappers for superslice 1 (SS1). In SMT4 mode, in FIG. 5, for a thread operating on SS0, e.g. threads T0 and T2, the history buffer entries in slice 0 (S0) mapped to the GPR are driven to ports 491, 492, 493, and 494. In other words, the multiplexors 431, 432, 433, and 434 are configured in SMT4 mode to select the history buffer entries from slice 0 (S0). In SMT4 mode, the direct connection between the recovery ports 495, 496, 497 and 498 and the GPR lookup in slice 1 of the history buffer is active and all four GPR lookups in slice 1 are driven to recovery ports 495, 496, 497, and 498. Four (4) GPR history buffer entries are released to the mapper for slice 0 (S0) per cycle in SMT4 mode, and four (4) GPR history buffer entries are released to the mapper for slice 1 (S1) per cycle in SMT4 mode for a total of eight (8) GPR entries released to the mapper per superslice per cycle in SMT4 mode.

Similarly, eight (8) VSR history buffer entries and eight (8) FPR history buffer entries are released per cycle to the mapper for superslice 0 (SS0) in SMT4 mode using multiplexors (not shown) that are arranged like multiplexors 431, 432, 433, and 434. Namely, in SMT4 mode, in an embodiment for a thread handled on SS0, in history buffer (SRB) 570, in slice 0, the FPR lookup 451, 452 will each look up two (2) FPR entries per cycle and drive them to multiplexors (not shown but configured like multiplexors 431-434 in FIG. 5) located before recovery ports 481-484, and in slice 1 FPR look up 453, 454 will each lookup two (2) FPR entries per cycle and drive them to multiplexors (not shown but configured like multiplexors 431-434) located before recovery ports 481-484. The four (4) FPR history buffers entries looked up in slice 1 will also be driven directly to FPR ports 485-488 in the same manner as GPR entries are directly driven to GPR recovery ports 475-478 for a total of eight (8) FPR LReg entries released to the FPR mapper by the history buffer. In SMT4 mode the multiplexors will select the FPR history buffer entries from slice 0 and the direct connection of FPR history buffer entries from slice 1 to FPR recovery ports 485-488 will be active. The same configuration of VSR lookups 461-464, connections to multiplexors (not shown in FIG. 5), and recovery ports 471-478 as the GPR lookups, multiplexors, and recovery ports, in an embodiment, would be used on superslice 0 (SS0—slice 0 and slice 1) to recovery eight (8) VSR LReg entries from the history buffer, for a thread handled on superslice 0 (SS0).

Likewise, in FIG. 5, for a thread operating on SS1, e.g., T1 or T3, in FIG. 5 eight (8) GPR history buffer entries, eight (8) VSR history buffer entries and eight (8) FPR history buffer entries are released to the mappers for superslice 1 (SS1) per cycle in SMT4 mode. The thread recovery bandwidth in history buffer (SRB) 570 in FIG. 5 is the same in SMT4 mode as in ST or SMT2 mode. That is, on a thread basis, twenty-four history buffer entries (8 GPR, 8 VSR, 8 FPR) are recovered per cycle in SMT4 mode, SMT2 mode and ST mode. No additional lookups are required in SMT4 mode as four (4) lookups per slice are performed in SMT4 mode and also in ST mode and SMT2 mode. Accordingly, no additional lookup hardware is required to lookup the logical register entries in ST, SMT2, or SMT4 mode. The direct connection of VSR ports 475, 476, 477, 478; the direct connection of FPR ports 485, 486, 487 and 488; and the direct connection of GPR ports 495, 496, 497 and 498, in an embodiment would only be active in SMT4 mode. In ST mode, SMT2 mode, and SMT4 mode, the multiplexors (shown in FIG. 5 for GPR portion) would select the LReg entries from VSR ports 471, 472, 473 and 474; FPR ports 481, 482, 483 and 484; and GPR ports 491, 492, 493, and 494.

In SMT4 mode, the idle recovery bandwidth into the logical register mappers will be used. In an embodiment, when recovering logical register entries (LRegs) in SMT4 mode from a thread handled on one superslice, e.g., SS0, the logical register mapper will use the recovery ports on that superslice, e.g., SS0, that were used to recover LRegs in ST mode and SMT2 mode from the other superslice, e.g., SS1. Each of the mappers for the logical registers already have recovery ports connected to the history buffer for both superslices. To overcome the recovery bandwidth penalty in the mapper when operating in SMT4 mode, each superslice can mux on the ports of the other superslice. For example, GPR entries released from the history buffer (SRB) 570 in superslice 0 (SS0) can use the GPR restore ports on superslice 0 that were used to restore GPR history buffer entries to superslice 0 (SS0) from superslice 1 (SS1) using a restore multiplexor, and vice versa. Instead of broadcasting four (4) history buffer entries per superslice, per mapper, each superslice can broadcast eight (8) history buffer entries per logical register mapper using the restore ports from the other superslice.

Figure 6:
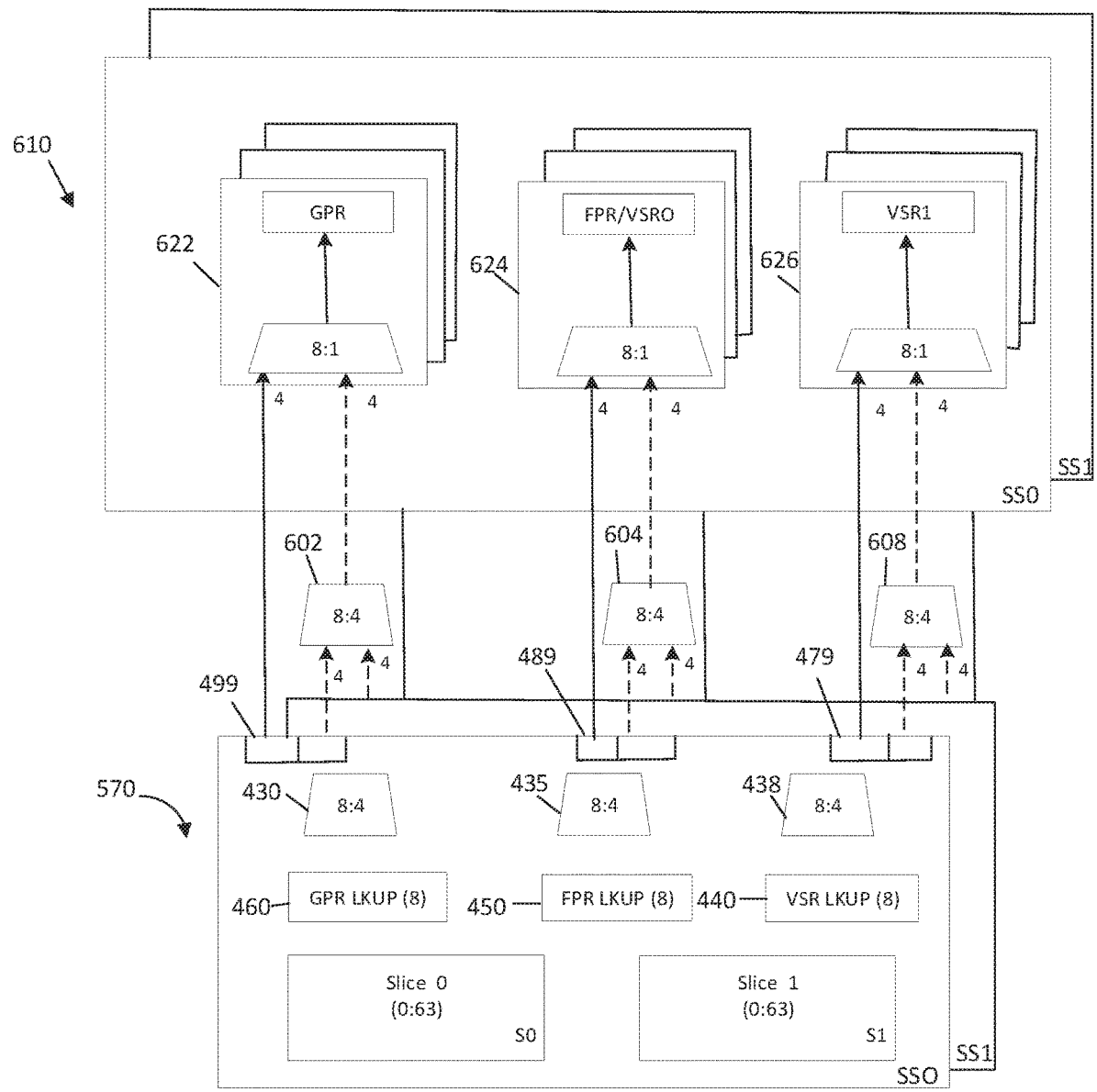
FIG. 6 illustrates a block diagram of a history buffer and a mapper for a logical register.

FIG. 6 shows a block diagram of history buffer 570 and logical register mapper 610, as may be configured for ST mode, SMT2 mode or SMT4 mode, according to an example in which aspects of the present disclosure may be practiced. FIG. 6 also shows restore multiplexors 602, 604, and 608. Restore multiplexors 602, 604 and 608 may each comprise one or more multiplexors. In the example of FIG. 6, a block diagram of superslice 0 (SS0) of history buffer 570 is shown with slices S0 and S1. Slice 0 and slice 1 of history buffer 570 each have sixty-four entries (64) or locations (0:63) for storing data and information. Superslice 0 (SS0) of history buffer 570 in FIG. 6 is configured as illustrated and described with reference to FIG. 5. Superslice 1 (SS1) of history buffer 570 in FIG. 6 can be configured the same as superslice 0 (SS0) shown and described with reference to FIG. 5.

As shown in FIG. 6, history buffer 570 has a GRP Lookup 460 which looks up eight (8) history buffer entries mapped to GPR; a FPR Lookup 450 which looks up eight (8) history buffer entries mapped to FPR, and a VSR Lookup 440 which looks up eight (8) history buffer entries mapped to VSR. History buffer 570 in FIG. 6 has multiplexors 430, 435, 438, and as shown in and described in reference to FIG. 5, the history buffer entries are driven to the multiplexors or directly connected to recovery ports. It will be appreciated that multiplexors 430, 435, and 438 may comprise one or more multiplexors, and in FIG. 5 each multiplexor 430, 435, 438 is configured as four separate multiplexors. For example, multiplexor 430 may comprise multiplexors 431, 432, 433, and 434 as shown and illustrated in FIG. 5. Multiplexors 435 and 438 can be configured similar to the arrangement of multiplexors 431, 432, 433 and 434, but configured and/or connected to VSR and FPR Lookups and recovery ports. In FIG. 6, the GPR entries looked up by GPR Lookup 460 are driven to multiplexor 430 and/or recovery ports 499; the FPR entries looked up by FPR Lookup 450 are driven to multiplexor 435 and/or recovery ports 489; and the VSR entries looked up by VSR Lookup 440 are driven to multiplexor 438 and/or recovery ports 479.

The GPR Lookup 460, the GPR multiplexor 430, and the GPR recovery ports 499, can be arranged, configured and operate as respective GPR Lookups 461-464; GPR multiplexors 431, 432, 433, and 434; and GPR recovery ports 491-498 illustrated and described in connection with FIG. 5. In this manner, eight (8) GPR history buffer entries mapped to GPR are looked up in superslice 0 by GPR Lookup 460, and in ST mode and SMT2 mode four (4) GPR history buffer entries are released by history buffer recovery ports 499 (ports 431-434) to the GPR logical register mapper 622; while in SMT4 mode, for a thread being handled on superslice 0 (SS0), four (4) GPR history buffer entries are released by ports 499 directly to the GPR mapper 622 on superslice 0 (SS0) and four (4) GPR history buffer entries are released to restore multiplexor 602. The four (4) GPR history buffer entries released to restore multiplexor 602 in superslice 0 (SS0) pass through to GPR mapper 622. In SMT4 mode, the restore multiplexor 602 selects the superslice 0 (SS0) entries because an even thread is being recovered and superslice 1 (SS1) is not used for flush recovery of even threads. The four (4) GPR history buffer entries released to restore multiplexor 602 are driven and/or released to mapper restore ports already in the GPR logical register mapper 622 and used by the GPR mappers for superslice 1 (SS1).

The FPR Look-up 450, the FPR multiplexor 435, and the FPR recovery ports 489 can be arranged, configured, and operate as respective FPR Lookups 451-454, FPR multiplexors (not shown although in an embodiment configured and arranged like GPR multiplexors 431-434 shown and described in connection with FIG. 5), and FPR recovery port 481-488 illustrated and described in connection with FIG. 5. In this manner, eight (8) FPR history buffer entries are looked up per cycle in superslice 0 (SS0) by FPR Lookup 450, and in ST mode and SMT2 mode four (4) FPR history buffer entries are released by recovery ports 489 to the FPR logical register mapper 624; while in SMT4 mode, for a thread being handled on superslice 0 (SS0), four (4) FPR entries are released by ports 489 directly to FPR logical register mapper 624 on superslice 0 (SS0) and four (4) FPR history buffer entries are released to restore multiplexor 604. The four (4) FPR history buffer entries released to restore multiplexor 604 pass through to FPR mapper 624. In SMT4 mode, the restore multiplexor 604 selects the superslice SS0 entries because an even thread, e.g., thread T0 or T2, is being recovered, and superslice 1 (SS1) is not used for flush recovery of even threads. The four (4) history buffer entries released to restore multiplexor 604 are driven and/or released to mapper restore ports in the FPR logical register mapper 624 that are used by the FPR mapper for superslice 1 (SS1).

The VSR Look-up 440, the VSR multiplexor 438, and the VSR recovery ports 479 can be arranged, configured, and operate as respective VSR Lookups 471-474, VSR multiplexors (not shown although in an embodiment configured and arranged like GPR multiplexors 431-434 shown and described in connection with FIG. 5), and VSR recovery port 471-478 illustrated and described in connection with FIG. 5. In this manner, eight (8) VSR history buffer entries are looked up per cycle in superslice 0 (SS0) by VSR Lookup 440, and in ST mode and SMT2 mode four (4) VSR history buffer entries are released by recovery ports 479 to the VSR logical register mapper 626; while in SMT4 mode, for a thread being handled on superslice 0 (SS0), four (4) VSR entries are released by ports 479 directly to VSR logical mapper 626 in superslice 0 (SS0) and four (4) VSR history buffer entries are released to a restore multiplexor 608. The four (4) VSR history buffer entries released to restore multiplexor 608 pass through to VSR mapper 626. In SMT4 mode, the restore multiplexor 608 selects the superslice 0 (SS0) entries because an even thread, e.g., thread T0 or T2, is being recovered, and superslice 1 (SS1) is not used for flush recovery of even threads. The four (4) VSR history buffer entries released to restore multiplexor 608 are driven and/or released to the mapper restore ports in the VSR logical register mapper 626 that are used by the VSR mapper for superslice 1 (SS1).

Figure 7:
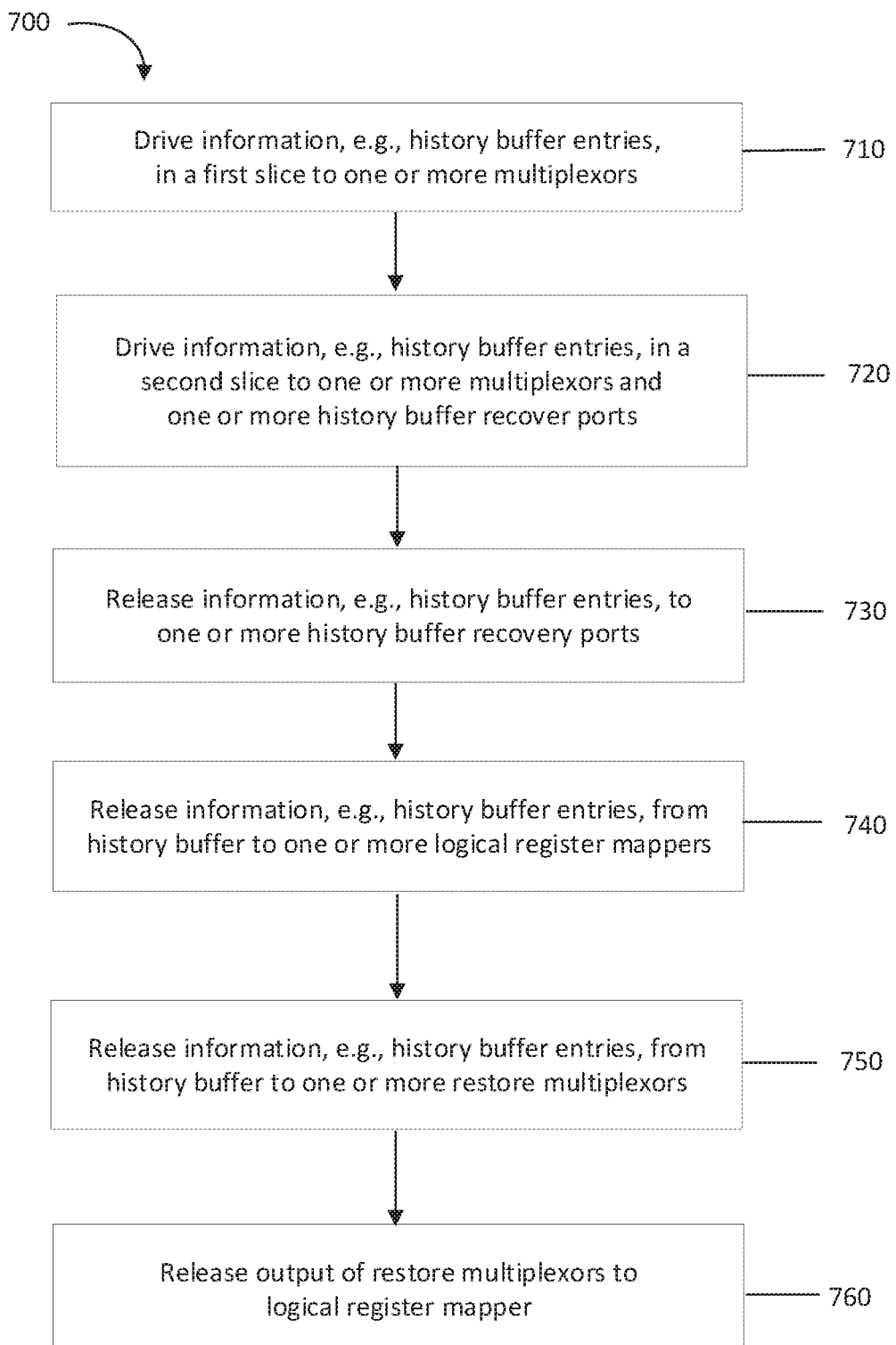
FIG. 7 illustrates a flow chart of a method of restoring a logical register.

FIG. 7 is an exemplary flowchart in accordance with one embodiment illustrating and describing a method of handling instructions in an information handling system, and more specifically a method of decreasing the time to recovery Logical Registers after a flush operation, and/or decrease the time to perform a flush/recovery operation in a processor, in accordance with an embodiment of the present disclosure. While the method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 7, but the process may be integrated and/or one or more steps may be performed together, simultaneously, or the steps may be performed in the order disclosed or in an alternate order.

A method 700 of handling instructions in a processor, such as for example as illustrated in FIGS. 5 and 6, and more specifically a method of recovering instructions in a processor to decrease latency of a processor, more specifically the flush-recovery latency of a processor, including in an aspect decreasing the latency associated with recovery processing from a history buffer, e.g., a Save & Restore Buffer (SRB) is shown in the exemplary flow chart of FIG. 7.

At 710, history buffer entries, preferably history buffer entries dedicated to a type of register, for example a general purpose register (GPR), are looked up and driven in a first slice to one or more multiplexors, for example, one or more history buffer multiplexors. In an embodiment, one or more history buffer entries may be looked up from one or more history buffer Lookups, and driven to one or more history buffer multiplexors. In an example, "N" history buffer entries in a first slice are looked up and driven to the one or more history buffer multiplexors per cycle, where "N" can be any number, for example, four (4). In an embodiment, the history buffer Lookup can be dedicated to a type of register, for example, a GPR Lookup, where the Lookup finds history buffer entries pertaining and/or belonging to that type of register, e.g., the GPR. In another aspect, the history buffer multiplexors can be associated with a specific register, for example, a GPR. By way of example, in a first slice, "N" GPR history buffers entries per cycle can be looked up by GPR Lookup and driven to one or more GPR multiplexors. In an embodiment, history buffer entries of a different type of register, for example, a Flooding Point Register (FPR) can also be looked up and driven to one or more multiplexors per cycle in a first slice. For example, FPR history buffer entries can also be looked up, by for example, FPR Lookup, and driven to one or more history buffer multiplexors, for example FPR history buffer multiplexors. In an aspect, the one or more multiplexors are associated with and preferably located before the history buffer recovery ports, and preferably between the history buffer Lookup and the history buffer recovery ports. Only by way of example, per cycle, "N" (e.g., four (4)) GPR history buffer entries in a first slice are looked up by GRP Lookup and driven to GRP history buffer multiplexors, "N" (e.g., four (4)) FPR history buffer entries in a first slice are looked up by FPR Lookup and driven to FPR history buffer multiplexors, and/or "N" (e.g. four (4)) VSR history buffer entries in a first slice are looked up by VSR Lookup and driven to VSR history buffer multiplexors, and/or "N" (e.g., four (4)) register type A history buffer entries in a first slice are looked up by register type A Lookup and driven to register type A multiplexors, where register A can be any type of register now known or hereafter created and/or developed.

At 720, history buffer entries, preferably history buffer entries dedicated to a type of register, for example a GPR, are looked up and driven in a second slice to one or more multiplexors, for example one or more history buffer multiplexors, and to one or more history buffer recovery ports. In an embodiment, the one or more multiplexors in 720 are the same one or more multiplexors as in 710. In a aspect, the process of 720 is similar to 710 however the history buffer lookups are driven to multiplexors and to one or more recovery ports. In an example, "N" history buffer entries in a second slice are looked up and driven to one or more history buffer multiplexors, and in an aspect, e.g., a particular operating mode, to one or more history buffer recovery ports. In an embodiment, the history buffer Lookup can be dedicated to a register type, e.g., GPR Lookup, and in an additional or alternate embodiment, the history buffer recovery ports can be dedicated to a register type, e.g., GPR recovery ports. Only by way of example, per cycle, "N" (e.g., four (4)) GPR history buffer entries in a second slice are looked up by GPR Lookup and driven to GPR history buffer multiplexors, and in an aspect driven to GPR recovery ports. While the above example used GPR register type, one skilled in the art can appreciate that in addition to the GPR Lookup and driving to GPR multiplexors and in an aspect to GPR recovery ports, additional and/or alternative register types, e.g., FPR, VSR, etc., may be utilized. For example, "N" register type A history buffer entries may be looked up by register type A Lookup in a second slice and driven to one or more register type A multiplexors, and in an aspect to register type A recovery ports where register type A can be one or more types of registers now known or hereafter developed.

At 730, history buffer entries are released and/or driven to one or more history buffer recovery ports. In an aspect, the history buffer entries driven to the multiplexors, e.g., the history buffer multiplexors, are released to one or more history buffer recovery ports. In an embodiment, the history buffer entries released from the history buffer multiplexors are released to different history buffer recovery ports then the recovery ports referred to in 720. In an aspect, the history buffer entries driven to the history buffer multiplexors are released to a different set of one or more recovery ports then the history buffer entries driven to the history buffer recovery ports in 720. As an example, in a first mode of operation, e.g., ST or SMT2 mode, history buffer entries driven to the history buffer multiplexors from the first slice and second slice are released to a first set of one or more history buffer recovery ports. In an embodiment of the example, the history buffer entries driven directly to the history buffer recovery ports in 720 are not released to the recovery ports, not activated, not read, and/or not written. For example, in an embodiment, in a first mode of operation, ST or SMT2, "N" register type A history buffer entries are driven in a first slice to register type A multiplexors and "N" register type A history buffer entries are driven in a second slice to the register type A multiplexors, and "N" register type A history buffer entries from either the first slice or second slice are selected per cycle by the register type A history buffer multiplexor and released (output) to the register type A history buffer recovery ports to which the register type A history buffer multiplexors are attached.

In an example, in a second mode of operation, e.g., SMT4, history buffer entries driven in the first slice to the history buffer multiplexors are released to a first set of one or more history buffer recovery ports and history buffer entries looked up in the second slice are released to a second set of one or more history buffer recovery ports. For example, in an embodiment, in a second mode operation, e.g., SMT4, "N" register type A history buffer entries are driven in a first slice to register type A multiplexors and "N" register type A history buffer entries are driven in a second slice to a second set of one or more register type A recovery ports, where "N" register type A history buffer entries in the first slice are selected by the register type A history buffer multiplexor and released per cycle to a first set of one or more register type A buffer recovery ports and "N" register type A history buffer entries are released per cycle to a second set of one or more register type A history buffer recovery ports.

At 740, information e.g., history buffer entries, are released and/or restored or recovered to a logical register mapper. In an embodiment, history buffer entries released to one or more history buffer recovery ports are released and/or driven to a logical register mapper. In an aspect, history buffer entries released to the first set of one or more history buffer recovery ports are released and/or driven to the logical register mapper. In an embodiment, the history buffer information released from the history buffer is received by a dedicated register type logical register mapper, eg., a GPR logical register mapper, and in an aspect may be received by one or more dedicated register type logical regular mapper restore ports, e.g., GPR restore ports on the logical register mapper. In an embodiment, "N" (e.g., four (4)) register type A history buffer entries released per cycle from a first set of one or more register type A history buffer recovery ports are released and/or driven to one or more of a first set of restore (write) ports of a register type A logical register mapper. By way of example, four (4) GPR history buffer entries looked up by GPR Lookup and released to GPR history buffer recovery ports are released and or driven to a first set of one or more restore ports in a GPR logical register mapper.

At 750, in an optional mode of operation, e.g., SMT4, information is released from the history buffer to one or more restore multiplexors. In an aspect, in the optional mode of operation, e.g., SMT4, history buffer entries are released to one or more restore multiplexors preferably positioned before a logical register mapper, preferably after the history buffer recovery ports and before the logical register mapper. In an embodiment, "N" (e.g., four (4)) register type A history buffer entries released and/or driven per cycle from a second set of one or more register type A history buffer recovery ports are released and/or driven to one or more register type A restore multiplexors. By way of example, in an optional mode of operation, e.g., SMT4, four (4) GPR history buffer entries released to a second set of one or more GPR history buffer recovery ports are released and/or driven to one or more GPR restore multiplexors.

In an optional mode of operation, e.g. SMT4, at 760, the information, e.g., history buffer entries, are released to the logical register mapper. Alternatively, or additionally, the output of the restore multiplexors are driven or released to the logical register mapper. In an embodiment, history buffer entries released and/or driven to the one or more restore multiplexors are released to the logical register mapper. In an embodiment, the output of the one or more restore multiplexors are connected to a second set of one or more restore ports to the logical register mapper. By way of example, in an optional mode of operation, e.g., SMT4, one or more of the register type A history buffer entries driven to the one or more register type A restore multiplexors is released and/or driven to the regular type A mapper, e.g., to a second set of one or more register type A restore ports. That is, in the optional mode of operation, e.g., SMT4, the one or more regular type A restore multiplexors are active and selects the outputs of the one or more restore multiplexors, and in an aspect selects the multiplexor outputs based upon the thread being handled by that super slice of the processor.

It can be appreciated that the method 700 has been discussed with respect to two slices of a processor S0:S1, which form a first super slice 0 (SS0) and that the processor may have one or more additional super slices, and that the additional super slices are preferably configured and operate the same as the first super slice 0 (SS0) discussed above. In this regard, in an embodiment, if a thread is handled on the first super slice 0 (SS0), the restore multiplexor selects the output to be the inputs received by the restore multiplexor from the first super slice 1 (SS0). The one or restore multiplexors would receive a second set of inputs from the history buffer recovery ports of the second super slice 1 (SS1). It will be appreciated that the register type A logical register mapper restore ports would be the same restore ports used by the mapper for cross super slice communication so that during ST and SMT2 mode the logical register for each of the two super slices have the same contents and are synchronized.

While the illustrative embodiments described above are preferably implemented in hardware, such as in units and circuitry of a processor, various aspects of the illustrative embodiments may be implemented in software as well. For example, it will be understood that each block of the flowchart illustration in FIG. 7, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems that perform the specified functions or steps, or by combinations of special purpose hardware and computer instructions.

The programs described herein are identified based upon the application for which they are implemented in a specific embodiment of the invention. However, it should be appreciated that any particular nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, circuitry, chip, code, or portions thereof, which comprises one or more circuits, and/or executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer system for processing information, the computer system comprising:
   at least one computer processor for processing instructions, the processor comprising:
      a history buffer having a plurality of entries for storing information associated with a processor instruction evicted from a logical register, the history buffer having at least one recovery port;
      a logical register mapper for recovering information from the history buffer, the mapper having restore ports to recover information from the history buffer; and
      a restore multiplexor configured to receive as inputs information from one or more of the history buffer recovery ports, and configured to output information to one or more of the logical register mapper restore ports.

2. The computer system according to claim 1, wherein the restore multiplexor comprises a plurality of multiplexors, with at least one restore multiplexor per mapper type.

3. The computer system according to claim 1, wherein the processor further comprises one or more physical register files partitioned by the register type, each partition having a plurality of entries to store data; and a logical register mapper for each register type, and a plurality of multiplexors where at least one multiplexor is dedicated to each register type.

4. The computer system according to claim 1, wherein one or more of the history buffer recovery ports are directly connected to the mapper restore ports.

5. The computer system according to claim 1, wherein one or more of the history buffer recovery ports bypass the restore multiplexors and connect to the mapper restore ports.

6. The computer system according to claim 1, wherein the history buffer comprises one or more history buffer multiplexors connected in front of the plurality of history buffer recovery ports.

7. The computer system according to claim 6, wherein a first set of history buffer recovery ports is connected to one or more history buffer multiplexors and a second set of history buffer recovery ports bypasses the one or more history buffer multiplexors.

8. The computer system according to claim 7, wherein the history buffer further comprises a history buffer Lookup that finds one or more history buffer entries that need to be recovered, and the second set of history buffer recovery ports are directly connected to the history buffer Lookup.

9. The computer system according to claim 1, wherein there are a plurality of logical register mappers and at least one logical register mapper is dedicated to a different register type than at least one of the other logical register mappers.

10. The computer system according to claim 9, wherein at least one or more restore multiplexors are dedicated to a different register type than at least one of the other restore multiplexors.

11. The computer system according to claim 9, wherein there are at least three logical register mappers, and each logical register mapper is dedicated to a different register type and each logical mapper has one or more restore ports dedicated to the register type to which the logical register mapper is dedicated, where those one or more dedicated restore ports receive information pertaining to the register type to which the restore port is dedicated.

12. The computer system according to claim 10, wherein the history buffer recovery ports are dedicated by register type.

13. The computer system according to claim 1, wherein the history buffer recovery ports are assigned by register type.

14. The computer system according to claim 1, wherein the history buffer comprises a first set of recovery ports and a second set of recovery ports, the first set of recovery ports connected to one or more history buffer multiplexors and the second set of history buffer recovery ports bypass the history buffer recovery ports.

15. The computer system according to claim 14, wherein the processor is configured to operate in a plurality of modes, wherein in a first mode of operation the history buffer releases information to the first set of history buffer recovery ports, and in a second mode operation the history buffer releases information to both the first set of recovery ports and the second set of recovery ports.

16. A computer system for processing information, the computer system comprising:
   at least one computer processor for processing instructions, the processor comprising per superslice:
      a history buffer having a plurality of entries for storing information associated with a processor instruction evicted from a logical register, the history buffer having "N" recovery ports and a Lookup to find "N" history buffer entries in response to a recovery process;
      a logical register mapper for recovering information from the history buffer, the mapper having "N" restore ports to recover information from the history buffer; and
      a restore multiplexor configured to receive as inputs information from one or more of the history buffer recovery ports, and configured to output information to one or more of the logical register mapper restore ports,
   wherein the processor is configured and adapted so that N/2 history buffer recovery reports are connected to the restore multiplexor and N/2 history buffer recovery ports are connected to the restore ports, where N is an integer.

17. The system according to claim 16, wherein the history buffer includes a history buffer multiplexor connected between N/2 history buffer recovery ports and the History Buffer Lookup.

18. The system according to claim 16, wherein the processor is configured as a pipeline and is further configurable to operate in a single thread (ST) mode or on four threads simultaneously (SMT4) mode, and the processor in both modes can recover the same number of history buffer entries to the logical register mapper.

19. A method of recovering information in a processor, comprising:
   driving information in a first slice to one or more history buffer multiplexors;
   driving information in a second slice to the one or more history buffer multiplexors and to one or more history buffer recovery ports;
   releasing information to one or more history buffer recovery ports;
   releasing information from one or more history buffer recovery ports to one or more logical register mappers;

releasing information from one or more history buffer recovery ports to one or more restore multiplexors; and releasing output of one or more restore multiplexors to one or more logical register mappers.

20. The method according to claim 19, wherein information driven in the first slice to the one or more history buffer multiplexors is selected to be released to a first set of one or more history buffer recovery ports and information driven in the second slice is driven to a second set of one or more history buffer recovery ports.

* * * * *